May 12, 1936.  H. W. CASEY  2,040,805
RECOVERY OF CAUSTIC HYDROXIDE FROM WASTE SOLUTIONS
Filed Sept. 1, 1933   3 Sheets-Sheet 3
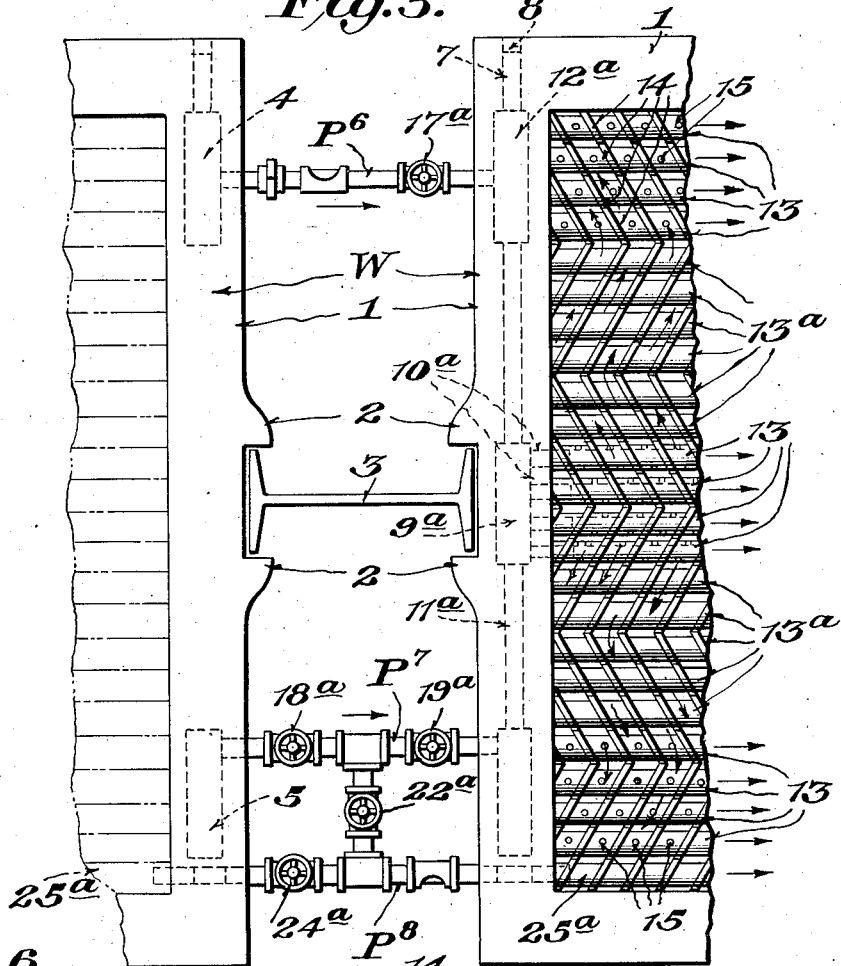
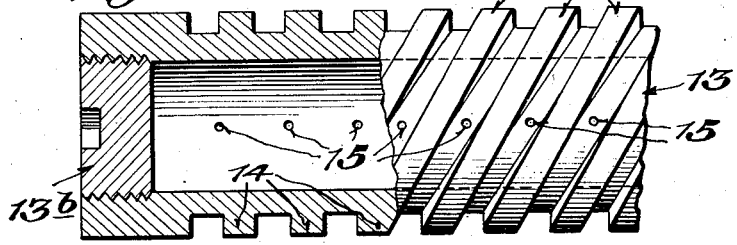
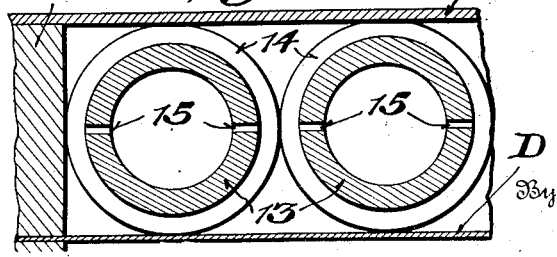
Inventor
H. W. Casey, Patented May 12, 1936

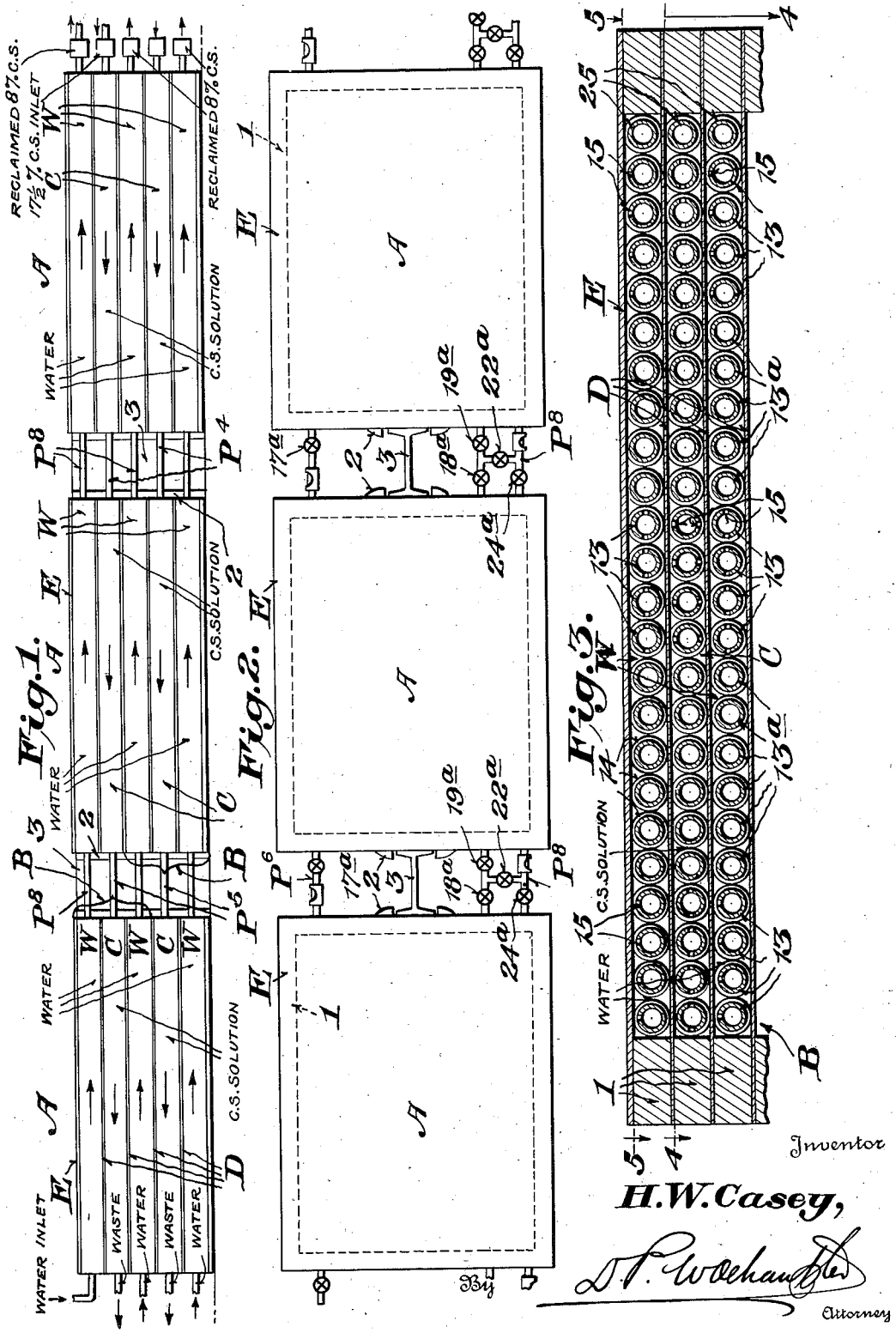

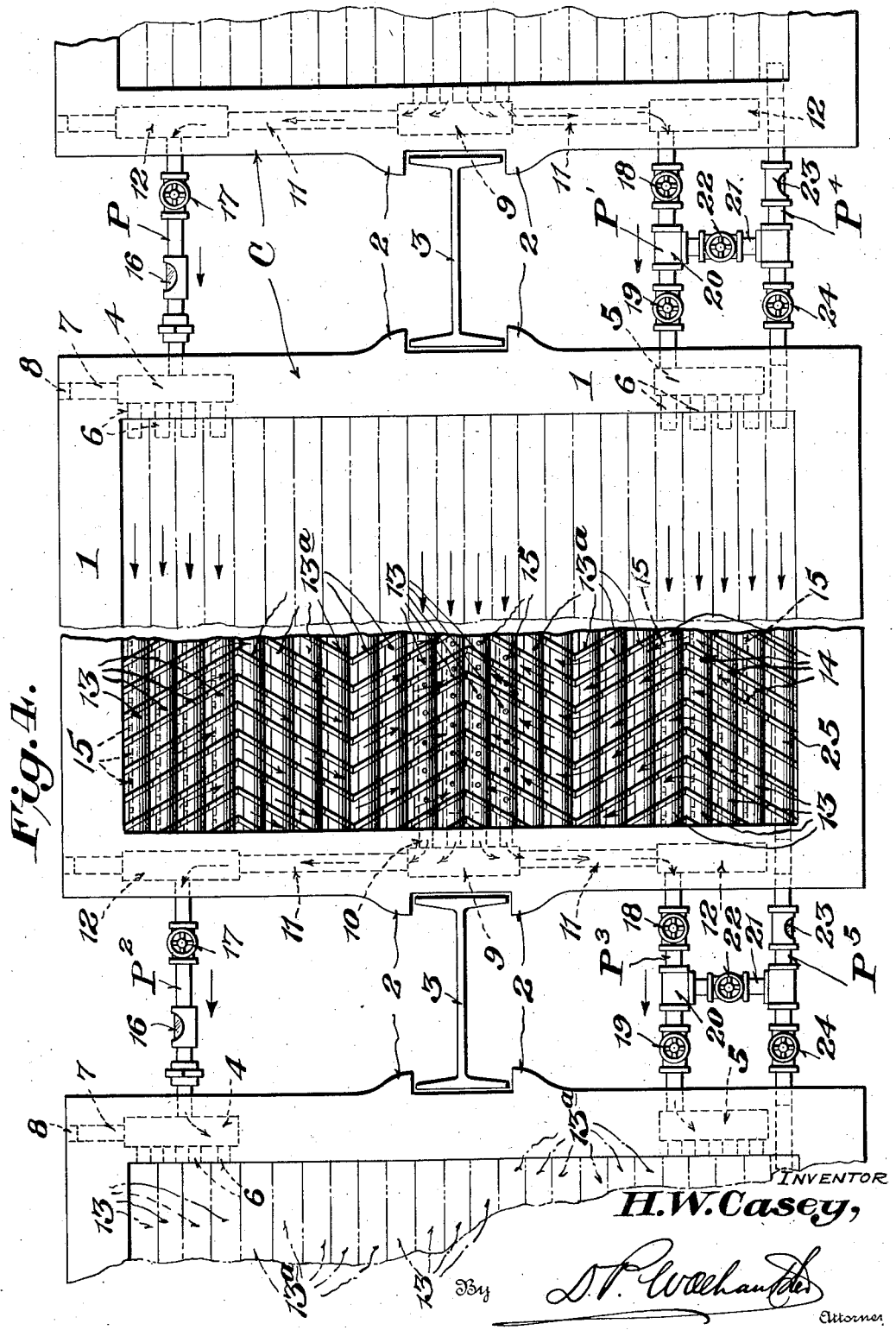

2,040,805

UNITED STATES PATENT OFFICE 2,040,805

RECOVERY OF CAUSTIC HYDROXIDE FROM WASTE SOLUTIONS

Hilton Wayne Casey, Boothwyn, Pa., assignor, by mesne assignments, of one-half to Jay Cooke Alexander, Media, Pa.

Application September 1, 1933, Serial No. 687,905

21 Claims. (Cl. 23—252)

This invention relates to the recovery of caustic hydroxides from impure solutions, and more particularly to a novel apparatus and process for efficiently recovering a large percentage of the caustic soda contained in waste solutions resulting from the treatment of pulp used in the rayon industry.

It is generally known that the waste solution referred to contains approximately 17½% of caustic soda and organic impurities such as hemicellulose. If the solution in this form is permitted to go to waste, not only some of the caustic soda, which might otherwise be re-used, is lost, but, at the same time, when discharged into rivers or streams, causes undesirable pollution of the water to such an extent that its presence is a menace not only from the standpoint of killing livestock, but also from a sanitary viewpoint.

Therefore, the present invention has primarily in view a novel apparatus and process for effecting a maximum recovery of the caustic soda which may be used again, while at the same time, the ultimate waste is diluted to such an extent that the undesirable results above pointed out are substantially minimized.

Another object of the invention is to provide an apparatus in which the impure caustic solution and recovery water are caused to flow in horizontal planes not only throughout the length of the entire apparatus but also in each individual cell. That is to say, it is proposed to effect maximum diffusion of both the chemical solution and water between relatively closely spaced dialyzer membranes in relatively thin layers or strata which enables the water used for recovery purposes to more efficiently and effectively pick up the caustic solution, while at the same time causing the organic celluloses to be effectively withheld from the recovery solution. In the foregoing connection, it is proposed to provide an apparatus comprising a progressive series of stacks of units, the units of each stack communicating with similar units in adjoining stacks, and each of said units comprising frames of similar structure alternately intended to carry water and the impure caustic solution, the flow of water being counter to the flow of the solution.

A further object of the invention is to provide a dialyzing apparatus consisting of a plurality of interconnected units, so arranged and disposed that if any one of the cells should break down, such disabled cell may be readily put out of commission through a by-pass connection, thereby making it unnecessary to shut down the entire apparatus at a time when it might not be convenient or desirable to do so, while at the same time facilitating the repair of the disabled unit inasmuch as one or more units at each side of the disabled unit may also be by-passed, temporarily, so that the disabled cell may be restored to normal efficiency by taking only a portion of the apparatus down and inserting a new dialyzer membrane.

A still further object of the invention is to provide a construction of great flexibility in the respect that the number of cells may be readily increased to provide additional units either above or below a given unit. In that connection, it is pointed out that a unit consists, in the present invention, of upper and lower water cells with an intermediate caustic solution cell, and therefore, as will be apparent, by adding appropriate additional cells above or below a given cell, the capacity of the apparatus can be materially increased.

With the above and other objects in view which will more readily appear as the nature of the invention is better understood, the invention consists in the novel features of construction, combination and arrangement of parts, hereinafter more fully described, illustrated in the accompanying drawings and defined in the appended claims.

A preferred and practical embodiment of the invention is shown in the accompanying drawings, in which:—

Figure 1 is a diagrammatic side elevation of a series of stacks, each comprising two units of cells, connected in accordance with the present invention.

Figure 2 is a top plan view of the apparatus shown in Figure 1.

Figure 3 is an enlarged transverse cross-sectional view taken through a unit consisting of three cells.

Figure 4 is a horizontal sectional view taken on the line 4—4 of Figure 3 illustrating the diffusing means within one of the caustic solution cells.

Figure 5 is a horizontal sectional view taken on the line 5—5 of Figure 3 illustrating part of the interior of one of the water cells.

Figure 6 is an enlarged detail view of one of the combined liquid conducting and diffusing tubes used in both the caustic solution cell and water cell, the disposition of the ports of which tube vary according to its use.

Figure 7 is an enlarged cross-sectional view taken through a pair of ported inlet tubes of a caustic solution cell.

Similar reference characters designate corresponding parts throughout the several figures of the drawings.

While dialytic methods have been heretofore proposed for the recovery of caustic hydroxides from waste solution, nevertheless, the apparatus involved has usually employed a plurality of vertically disposed cells wherein the impure caustic solution is flowed between a pair of dialyzer membranes, while water is caused to flow in the opposite direction on the outside of the dialyzer membranes. In this practice, the relatively heavy organic material in waste solution has a tendency to collect at the bottoms of the solution cells, while at the same time, the velocity of flow through the cells is relatively slow with consequent sacrifice of adequate diffusion, thereby materially affecting the speed and efficiency of the recovery process.

On the contrary, the apparatus of the present invention is constructed on a horizontal flow principle for both the caustic solution and the water which permits of maintaining the flow of both liquids at a comparatively high velocity, while at the same time providing a maximum area of contact between the caustic solution and the water, to effect the recovery of the caustic solution passing through the dialyzer membranes into the recovery water; and also permitting the impure organic matter to have a relatively unobstructed flow, not only through each particular cell but through the caustic solution cells of adjacent units, thereby not retarding or resisting the passage of the waste solution toward the waste outlet of the last stack.

Referring to the drawings, it will be observed from Figure 1 that the apparatus consists of a plurality of interconnected stacks or batteries of units designated generally as A. Each stack or battery consists of a plurality of units B, and each unit B, in turn, consists of an intermediate impure caustic solution cell C having above and below the same a water cell W. It will, therefore, be apparent from Figure 1 that each stack A is illustrated as comprising two cells B. When the units are thus arranged, it will be apparent that the intermediate water cell W (Figure 1) is common to both the upper and lower units of the same stack, and, of course, this arrangement may prevail throughout if it is desired to increase the number of cells vertically to provide an apparatus of greater capacity.

In increasing the capacity of each stack in this manner, it will, of course, be understood that due regard must be had to the strength of the caustic solution to be recovered, since if the units were increased indefinitely for a caustic solution of a given strength, the dilution of the recovered caustic solution might be so great as to minimize the benefits of recovery.

Figure 3 of the drawings illustrates in cross-section one of the units B comprising the impure caustic solution cell C having above and below the same one of the water cells W, each of said cells being separated by a dialyzer membrane D, the top or bottom cell of the unit, as the case may be, being provided with a cover plate or wall E which may be of metal or other material impervious to water and intended to insure liquid-tightness of the unit.

The construction of the cells C and W comprising each of the units B is similar, except for the disposition of the ports in the sides of the tubes which form a part of each cell. Therefore, a general description of one cell will suffice for the others.

Accordingly, as will be apparent from the drawings, each cell preferably consists of a rectangular metallic frame 1 having at opposite ends thereof the aligning abutments 2—2 for receiving an aligning and centering member 3 which may be in the form of a vertically disposed I-beam, anchored at its lower end, to assist in locating the frames in one stack of units with the frames in an adjacent stack. The superposed frames may be clamped or held together by the bolts or other fastenings, not shown.

Referring to Figures 4 and 5, respectively, showing a caustic solution and water cell, it will be observed that the frame 1 is provided in one end wall with a pair of spaced non-communicating chambers 4 and 5, the same having at one side thereof the threaded nipple elements 6. The chamber 4 is provided with a laterally disposed clean-out or sampler opening 7 normally closed by a plug 8. The opposite end wall of the frame 1 is provided with a centrally located chamber 9 having the threaded nipples 10 communicating with the inner side thereof while the ends of said central chamber are connected by the communicating passages 11 with the end chambers 12—12. One of the latter may also be provided with a clean-out top 7—8 similar to chamber 4.

Each of the frames 1 are provided with a plurality of tubes 13 and 13$^a$ arranged in groups. The said tubes 13 and 13$^a$ have an exterior worm rib 14 which provides a continuous worm baffle, and the tubes 13 are provided in the valleys or spaces between the ribs with the radially disposed ports 15. As will be observed from Figures 6 and 7, the tubes may be positioned circumferentially so that the said ports 15 may be disposed horizontally or vertically, according to whether they are used as discharge or inlet ports as will presently appear. The tubes 13$^a$ do not have side ports and, therefore, merely serve as fillers, their worm ribs, however, serving as diffusing baffles.

As will also be observed from Figure 6, certain of the tubes 13 may be plugged at one end as at 13$^b$ to insure the proper course of the liquid. The tubes 13 and 13$^a$, when laid side by side so that their worm ribs 14 touch each other, provide oblique liquid guiding channels as will be apparent from both Figures 4 and 5; and, so that the flow of liquid will be better diffused, and not pass in a continuous oblique line from one side of the frame to the other, adjacent groups of tubes may be reversed, end for end, so that their worm threads will provide channels arranged oblique to the channels of adjacent groups, thereby providing in effect staggered diffusion channels extending transversely of the frames and between the dialyzer membranes.

It will thus be apparent that all of the tubes are not conductors of liquid. That is to say, the tubes 13$^a$ for example are "blind" tubes in the sense that they have no radial ports, as previously indicated, and although they are, therefore, merely used as fillers between groups of tubes having ports, their worm ribs providing conducting channels for obtaining a maximum diffusion of liquid over the dialyzer membranes D clamped between the superposed frames 1—1, they also serve to support the dialyzer membranes throughout their expanse between the sides and ends of the frames.

With the foregoing general description of the individual cells, reference will now be made to Figure 4 which shows one of the impure caustic solution cells C.

Connected with the chambers 4 and 5 through the medium of the threaded nipples 6 are the ported tubes 13, the ports 15 being horizontally arranged. The ends of these tubes 13 which are connected with the chambers 4 and 5 are preferably plugged as indicated at 13$^b$. Therefore, impure caustic solution fed into the chambers 4 and 5 through the pipe connections P and P' will be forced laterally and horizontally through the ports 15 of the outer tubes and discharged into ports 15 of the inner tubes as shown in Figure 4. Thus the caustic solution makes its way toward the center of the cell through the guiding channels provided by the matching worm ribs 14. The purpose of arranging the discharge ports 15 horizontally is to prevent the jet-like force of the discharging impure caustic solution from being directed against the dialyzer membrane D which may be of parchment paper or other suitable membrane. As the impure caustic solution flows through the ports 15 it encounters the guiding effect, not only of the contacting worm ribs 14 of the tubes 13 but also of the groups of the filler tubes 13$^a$ arranged immediately adjacent the group of feed tubes 13. At the center of the cell, that is, between the groups of filler tubes 13$^a$, there is provided a second group of ported tubes 13 whose ports are perpendicularly or vertically disposed so as to receive the impure caustic solution which makes its way from the groups of the tubes 13 at the sides of the frame after passing through the staggered channels provided by the worm threads of the filler tubes 13$^a$. The central group of tubes 13 are closed at one end by plugs 13$^b$ while the opposite ends thereof are connected with the threaded nipples 10 which communicate with the chamber 9. Thus, it will be apparent that the impure caustic solution fed into the cell C through the pipes P and P' is first conducted through the outer groups of tubes 13 and discharged laterally over and about the filler tubes 13$^a$, as shown by the arrows in Figure 4, and makes its way into the vertically disposed ports 15 of the central group of ported tubes 13 from whence it is connected to the chamber 9. Thereafter the impure solution goes through the passages 11 into the chambers 12 and to the pipes P$^2$ and P$^3$ at the discharge side of the cell.

The pipes P and P$^2$ may be provided with transparent members 16 so that the flow from one unit to another may be observed, and said pipes may be also provided with the valves 17 for controlling flow therethrough. Likewise the pipes P' and P$^3$ may be provided with the valves 18 and 19 arranged at each side of a T-fitting 20 which leads to a line 21 controlled by a valve 22, the said line 21 in turn communicating with by-pass pipe line connections P$^4$—P$^5$.

The by-pass pipe line connections P$^4$—P$^5$ are provided with transparent fittings 23 and also with valves 24, the said by-pass line communicating through the medium of suitable nipples with a by-pass pipe 25 arranged within and at one side of the cell next to the frame. Under ordinary conditions impure caustic solution is fed to the cell through the pipe lines P and P' and discharged therefrom through the pipe connections P$^2$ and P$^3$. However, should the cell break down due to puncturing of the dialyzing diaphragm D, or for any other reason, the valve 17 in pipe line P may be closed, and likewise the valve 19 in pipe line P' may be closed, thereby to short-circuit the flow through the pipe 21 to the by-pass line P$^4$. In this way, all of the flow through the cell will stop and the caustic solution will be by-passed entirely through the pipe line P$^4$, by-pass tube 25, and line P$^5$ to the corresponding cell of the next adjacent unit.

If the cell immediately preceding the cell C, just referred to has also been put out of commission, and fluid is being shunted through its by-pass tube 25, either or both of the valves 18 and 22 will be closed so that no liquid can be fed to either disabled cell from the by-pass line P$^4$—25.

In the foregoing description, with reference to the operation of the caustic solution cell C, it will be observed that the flow of liquid is from right to left as shown in Figure 4. As previously explained, the caustic solution cell has disposed at each side thereof a water cell W, and the flow in these cells is directly the opposite or counter to the flow in the caustic solution cells. Therefore, by reference to Figure 5, it will be observed from the direction of arrows therein, that the flow of water in the recovery cells is from left to right.

Referring further to Figure 5, it will be apparent that water is supplied to the cell W at the right-hand side of the figure through the pipes P$^6$ and P$^7$, the former having therein the valve 17$^a$ and the latter having therein the valves 18$^a$ and 19$^a$ adapted to perform the same functions as the valves 17, 18 and 19 previously described. From the water feeding pipe lines P$^6$ and P$^7$, recovery water is fed into the chambers 12$^a$ and thence through the passages 11$^a$ to the central chamber 9$^a$ which is connected by the nipples 10$^a$ to the central group of tubes 13 having their worm portions 14 in contact, and also having their discharge ports 15 arranged horizontally to avoid the effect of jet pressure against the dialyzer membrane. The central tubes 13, which are the recovery water intake tubes, are so arranged that one pair of tubes has its worm portions in matching relation, while the adjacent pair of tubes has its exterior worm portions arranged obliquely thereto to line up with the worm portions of adjacent filler tubes 13$^a$ arranged in groups of five at each side of the group of centrally disposed water inlet tubes. The filler tubes 13$^a$ are, of course, imperforate and, therefore, the worm portions 14 thereof merely serve as fins or guides for diffusing the recovery water outwardly towards the sides of the cell and in a generally staggered stream toward the groups of intake tubes 13 arranged adjacent the sides of the unit. The intake tubes 13 have their ports 15 arranged vertically or perpendicularly to receive the recovery water and conduct it to the opposite end of the frame from whence it is discharged into the frame of the corresponding cell in the succeeding stack of units.

If it is desired to put out of commission the water cell W at the right-hand side of Figure 5 and by-pass water through the tube 25$^a$, it is only necessary to close valves 17$^a$ and 19$^a$. This will completely shut off the water supply to chambers 12$^a$ and water from the preceding cell will pass through valves 18$^a$ and 22$^a$ into line P$^8$ which connects with by-pass tube 25$^a$, the valve 24$^a$ in the line P$^8$ being closed. This description applies where the water cell at the left-hand side of Figure 5 is in commission and it is desired to de-commission the water cell at the right-hand side of Figure 5.

Now, assuming that the water cell at the left-hand side of Figure 5 is out of commission, and it is also desired to de-commission the cell at the right-hand side, valve 17ª is closed and likewise valve 22ª and either of the valves 18ª or 19ª may be closed while the valve 24ª in the pipe line P⁸ is open to receive water from the by-pass tube 25ª of the cell at the left-hand side of Figure 5.

From the foregoing, it will be apparent that the present construction includes an impure caustic solution cell flanked above and below by a water cell, the flow in the caustic solution cells and water cells being opposite to each other, and the cells being separated by a suitable dialyzer membrane D. In the case of caustic solution cells, the caustic solution is led into said cells from the sides of the frames and discharged horizontally over and about the worm ribs on the tubes to produce the desired extended diffusing effect. The caustic solution is withdrawn from the center of the caustic solution cell and then fed to the group of caustic solution inlet tubes of the succeeding unit, etc. In the case of the water cells, the recovery is led into a central group of ported tubes 13 and discharged laterally and outwardly towards the receiving tubes located in groups at each side of the water cell frame. Therefore, water passes from the center of the cell outwardly in a horizontal plane, while caustic solution works inwardly from the outside of the frame of the cell towards the center, and by reason of the extended area over which the water is caused to flow by the diffusion caused by the arrangement of the worm baffles of the tubes, a maximum amount of recovery water comes in contact with a maximum quantity of impure caustic solution.

The apparatus provides for a continuous recovery process as will be apparent from an inspection of Figure 1, reclaimed caustic soda being obtained from the last unit of cells opposite the fresh water inlet, and the impure diluted caustic solution will be discharged from the apparatus at the same end that fresh water is taken in.

In addition to the increased diffusion effected by the arrangement of tubes and cells, it will be apparent that the tubes of each cell form a support for the dialyzing membrane D so that no screens or other supports are necessary. In each instance, the ports of the tubes which discharge either caustic solution or water are so arranged as not to cause jets of fluid issuing therefrom to impinge on the dialyzer membrane, thereby materially increasing their life and minimizing the necessity of replacements.

While the apparatus has been particularly described in connection with the recovery of caustic soda, extensively used in the rayon industries, nevertheless, it may be effectively used for the recovery of other chemical solutions wherever a dialyzer would be suitable.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a dialytic apparatus, a chemical solution cell, and a water cell arranged horizontally in juxtaposed relation and having a dialyzer membrane therebetween, and liquid conducting and diffusing tubes having worm rib exteriors arranged within each cell, the tubes of adjacent cells serving to support and clamp the membrane disposed between the cells.

2. In a dialytic apparatus, a chemical solution cell, and a water cell arranged horizontally in juxtaposed relation and having a dialyzer membrane therebetween, each of said cells comprising a frame having spaced non-communicating chambers at one end and also having spaced and intermediate communicating chambers at the other end, tubes having external continuous worm baffles arranged in each cell with the surfaces of the worm baffles of adjacent tubes in lateral contact, and the worm surfaces of tubes in superposed cells clamping the dialyzer membrane therebetween, the said tubes in the chemical solution cell being arranged in groups at each side of the cell and having laterally opening ports, and a group of intermediate tubes having vertically disposed openings, said groups of side and intermediate tubes having therebetween groups of imperforate filler tubes having their worm baffles arranged reversely to the baffles of the groups of tubes at the sides and middle of the cell; and the said water cell having a central group of tubes provided with laterally opening discharge ports and side groups of tubes with vertically disposed inlet ports, the said groups of central and side tubes having therebetween intermediate imperforate filler tubes having their worm baffles reversely related to the worm baffles of the central and side groups of tubes.

3. A process for the recovery of chemicals in solution which consists in flowing the chemical solution from the sides of a dialyzer cell in a relatively thin stratum toward the center and extracting said solution from the center of the solution cell; and simultaneously feeding recovery water in relatively thin strata from the center of water cells, at each side of the chemical solution cell, toward the sides of said water cells and then extracting the recovery water solution from the sides of the water cells.

4. A dialytic apparatus including a plurality of stacks of dialyzer units, each comprising horizontally disposed frames having a dialyzer membrane therebetween to provide cells and each of said units consisting of horizontally disposed recovery water cells and an intermediate chemical solution cell thereby to provide continuous horizontal flow, abutment means at the end of each frame, aligning and centering means for engaging with said abutment means to maintain the stack of frames in apparatus alignment, and conduit means for connecting the corresponding cell of each unit in adjacent stacks.

5. A dialytic apparatus including a plurality of stacks of dialyzer units, each including horizontally disposed cells thereby to provide continuous horizontal flow, a frame for each cell, abutment means on each frame, aligning and centering means for engaging with the abutment means of the frames in each stack to center the same, valved pipe lines connecting corresponding cells of the units of each stack and by-pass pipe lines for the cells of each unit connecting with the corresponding cells of units in adjacent stacks for rendering selected cells inoperative.

6. A cell for dialytic apparatus comprising a frame, dialyzer membranes at opposite sides thereof, said frame having spaced non-communicating chambers at one end and having at its opposite end spaced and intermediate communicating chambers, a plurality of tubes within the frame and each having external continuous worm baffles and arranged in groups, the outer groups communicating with the non-communicating chambers of the frame and a medial group communicating with the said intermediate chamber, the worm baffles of each individual group being arranged in oblique alignment and the worm baffles of adjacent groups of tubes being arranged in reverse oblique alignment to provide a staggered liquid diffusing path over the dialyzer membranes, certain of said tubes having outlet ports and others of said tubes having inlet ports.

7. A cell for dialytic apparatus comprising a frame, dialyzer membranes at opposite sides thereof to provide a liquid cell, and a plurality of liquid conducting and diffusing tubes arranged within the frame, outer and medial tubes having ports to discharge and receive liquid, and all of said tubes having exterior worm baffles whose peripheries engage each other and the membranes, and means in the frame for establishing liquid communication with said outer and medial tubes.

8. In a dialytic apparatus, a chemical solution cell comprising a frame, dialyzer membranes at opposite sides thereof, said frame having non-communicating chambers at one end, and also having communicating chambers at the other end, side groups of laterally ported tubes having external worm ribs, said side groups of tubes communicating at one end with said non-communicating chambers, a vertically ported intermediate group of tubes having external worm ribs, said last-mentioned group of tubes communicating at one end with said communicating chambers of the frame, and filler tubes having external worm ribs arranged between said side and intermediate groups of tubes, the worm ribs of all of said tubes being juxtaposed and in contact with the membranes to provide tortuous liquid paths over the membranes.

9. In a dialytic apparatus, a water recovery cell comprising a frame, dialyzer membranes at each side thereof, said frame having communicating chambers at one end and non-communicating chambers at the other end, a central group of laterally ported tubes having external worm ribs and in communication at one end with said communicating chambers, side groups of vertically ported tubes having external worm ribs and communicating at one end with said non-communicating chambers, and filler tubes arranged between said central and side groups of ported tubes, said filler tubes being blocked off at the ends and having worm ribs, the worm ribs of all of said tubes being juxtaposed and in contact with the membranes to provide a tortuous liquid path over the membranes.

10. A dialytic cell comprising a frame having liquid chambers at opposite ends, a membrane at each side of the frame, a plurality of tubes arranged side by side within the frame and having external worm ribs engaging the membranes, thereby to cause flow in longitudinal and zigzag lateral directions to provide maximum liquid diffusion over the surface area of the membranes and certain of said tubes communicating with said chambers and having ports.

11. A dialytic apparatus including a plurality of horizontally disposed solution cells, liquid jet producing means in each cell and said cells being arranged in a horizontal series to provide liquid flow in relatively thin strata in a horizontal direction, thereby eliminating the tendency of solid matter agitated by said jet means and entrained in the solution to gravitate to the bottom of the cell.

12. A dialytic apparatus including a horizontal series of stacks of horizontally disposed cells, liquid jet producing means in each cell, and the corresponding solution cells of all the stacks being arranged in the same horizontal plane to provide liquid flow in relatively thin strata in a horizontal direction thereby eliminating the tendency of solid matter entrained in the solution and agitated by said jet means to gravitate to the bottom of the cell.

13. A dialytic apparatus including a plurality of horizontally disposed solution cells, including membranes, liquid jet producing means in each cell, and said cells being arranged in a horizontal series to provide liquid flow in a relatively thin strata in a horizontal direction, thereby to provide less gravity resistance to solid matter agitated by said jet means and entrained in the flowing solution, and also provide relatively balanced liquid pressure on each side of the membranes to relieve the same from puncturing stress.

14. A dialytic apparatus including a cell comprising a frame, dialyzer membranes at each side thereof, said frame having liquid chambers at opposite ends, a centrally disposed ported tube having an external worm rib and communicating with a chamber at one end of the frame, a ported tube adjacent each side of the frame and each tube having an external worm rib and each communicating with a chamber at the end of the frame opposite the chamber with which the central tube and the said tubes located at the sides of the frame and having external worm ribs, and filler members having external worm ribs arranged between the ported tubes, the worm ribs of said tubes and said filler members being juxtaposed to provide a tortuous liquid path over the membranes.

15. A dialytic apparatus including a cell comprising a frame, dialyzer membranes at each side thereof, and liquid diffusing means within the cell, said means comprising liquid conveying tubes arranged in spaced relation and having ports establishing communication between the interior of the tubes and the interior of the cell, and baffle members arranged in the space between said ported liquid conveying tubes.

16. A dialytic apparatus including a cell comprising a frame, dialyzer membranes at each side thereof, and liquid diffusing means within the cell and between said membranes, said means comprising liquid receiving and discharging tubes having ports establishing communication between the interior of the tubes and the interior of the cell, said tubes being spaced apart, and filler members arranged in the space between said tubes and having means for diffusing and deploying liquid traveling between said liquid receiving and discharging tubes.

17. A dialytic apparatus including a cell comprising a frame, dialyzer membranes at each side thereof, and liquid diffusing means within the cell and between said membranes, said means comprising liquid conveying tubes arranged respectively at the center and adjacent the sides of the frame, and having ports in the walls thereof for establishing communication between the interior of the tubes and the interior of the cell, filler members arranged between said tubes, and said tubes and filler members having baffle means on the exterior thereof for diffusing the liquid moving through the cell.

18. A dialytic apparatus including a pair of cells formed by adjacent frames and a membrane therebetween, liquid supplying and diffusing means in each cell at opposite sides of the membrane, said means comprising liquid conveying tubes arranged in spaced relation and having ports establishing communication between the interior of the tubes and the interior of the frames, baffle means arranged in the space between said ported liquid conveying tubes, and means for conveying liquid away from each cell.

19. A dialytic cell comprising a horizontally disposed frame, a membrane at each side of the frame, a plurality of liquid diffusing members arranged within the frame and extending in the general direction of flow through the frame, said members having external means for guiding the liquid substantially obliquely to the general direction of flow and for also supporting and engaging the membrane at each side of the frame at spaced points, means for supplying liquid to the cell, and means for conveying liquid therefrom.

20. A dialytic apparatus comprising a plurality of liquid cells connected in horizontal series, each cell including a frame and membranes at the sides thereof, ported liquid discharging and receiving tubes spaced apart transversely of each cell and extending from end to end thereof and also arranged parallel to the general direction of flow through the cell formed by the adjacent frames and membranes, and baffle members arranged between the tubes to diffusely distribute liquid from and to said liquid discharging and receiving tubes and over the membranes.

21. A dialytic apparatus including a dialyzing cell comprising adjacent frames and a membrane therebetween, liquid supplying and diffusing means at opposite sides of the membrane, said means comprising liquid conveying tubes having ports establishing communication between the interior of the tubes and the interior of the frames, and means for conveying liquid away from opposite sides of the membrane after it has been diffused thereover by said liquid supplying and diffusing means.

HILTON WAYNE CASEY.